No. 672,886. Patented Apr. 30, 1901.
C. L. BERGER.
EQUATORIAL ADAPTER FOR TRANSITS.
(Application filed Feb. 19, 1901.)
(No Model.)
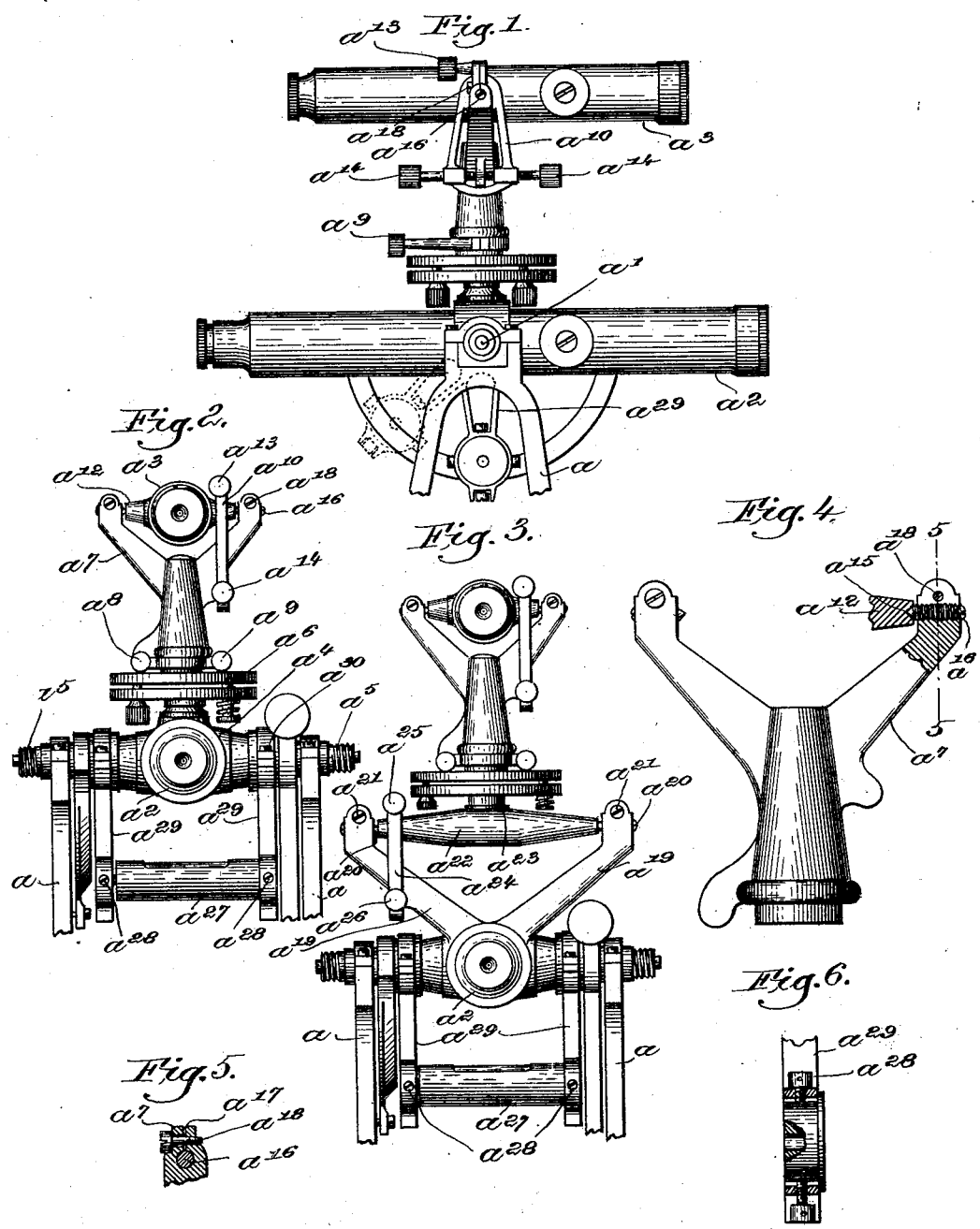
Witnesses:
Thomas J. Drummond
Adolph O. Kaise
Inventor:
Christian L. Berger,
by Crosby Gregory
atty's.
THE NORRIS PETERS CO., PHOTO-LITHO., WASHINGTON, D. C.

UNITED STATES PATENT OFFICE.

CHRISTIAN L. BERGER, OF BOSTON, MASSACHUSETTS.

EQUATORIAL ADAPTER FOR TRANSITS.

SPECIFICATION forming part of Letters Patent No. 672,886, dated April 30, 1901.

Application filed February 19, 1901. Serial No. 47,988. (No model.)

*To all whom it may concern:*

Be it known that I, CHRISTIAN L. BERGER, a citizen of the United States, residing at Boston, in the county of Suffolk and State of Massachusetts, have invented an Improvement in Equatorial Adapters for Transits, of which the following description, in connection with the accompanying drawings, is a specification, like letters on the drawings representing like parts.

My present invention is an improved equatorial adapter particularly intended for use in connection with mining-transits.

In my copending application, Serial No. 737,267, filed November 17, 1899, I have fully explained the purposes and general operation of what I term an "equatorial adapter," and therefore I will not go into the technical details thereof in this case. In this class of instruments, in which there is a main telescope and a superposed auxiliary telescope, it is essential for the greatest accuracy that the auxiliary telescope should be capable of having a movement strictly parallel to the plane including the main telescope and its transverse axis for the purpose of bringing the two telescopes into perfect alinement with each other; but heretofore the nearest approach to such adjustment has been a swinging adjustment, such as is shown in my aforesaid application, and accordingly the main feature of my present invention relates to provisional means for moving or shifting the auxiliary telescope laterally in a plane parallel to the plane of the main telescope.

The constructional details of my invention will be pointed out in the course of the following description, reference being had to the accompanying drawings, in which I have illustrated one form of my invention.

In the drawings, Figure 1 is a fragmentary view of a sufficient portion of a field instrument to render my invention readily understood. Fig. 2 is a front elevation thereof. Fig. 3 is a similar view of a modified construction. Fig. 4 is an enlarged detail showing in elevation the special means for securing the adjustment desired. Fig. 5 is a sectional view thereof, taken on the line 5 5, Fig. 4. Fig. 6 is a sectional detail of the level.

The general form of apparatus to which I have applied my invention is a mining-transit comprising standards $a$, in which is mounted on a horizontal axis $a'$ a main telescope $a^2$, carrying an auxiliary telescope $a^3$, supported on a post $a^4$ thereof and adapted to be mounted on the ends $a^5$ of the main-telescope axis, as more fully explained in my Patent No. 559,117, dated April 28, 1896. As shown in Figs. 1 and 2, the post $a^4$ carries a trivet adjustment $a^6$, on the upper plate of which opposite arms, constituting a Y-support $a^7$, are adjustably mounted, being provided with a slow-motion adjustment $a^8$ and a clamping adjustment $a^9$ of the same kind which is commonly provided for ordinary transits. The auxiliary telescope has a clamping-arm $a^{10}$ mounted on its pivotal axis $a^{12}$, adapted to be clamped or released by the set thumb-screw $a^{13}$ and having opposite adjusting-screws $a^{14}$ for coarse and fine adjustments. At its opposite ends the axis $a^{12}$ has conical recesses $a^{15}$, which receive conical bearings $a^{16}$, preferably threaded, as shown in Fig. 4, and mounted in the ends of the Y-support $a^7$, said ends being provided with clamping means, herein shown as consisting of split ends $a^{17}$, to be clamped together by a set-screw $a^{18}$. By means of this simple construction the auxiliary telescope $a^3$ may be shifted accurately one way or the other simply by tightening the bearing $a^{16}$ at one end of the axis $a^{12}$ and loosening the opposite bearing $a^{16}$ at the other end of said axis, and when the precise adjustment required has been obtained the two bearings $a^{16}$ are clamped immovably by the set-screws $a^{18}$, so as to maintain the said adjustment without possibility of change. For some kinds of work it is also desirable that the entire adapter (the adapter consisting of all the mechanism carried on the post $a^4$) should be capable of lateral adjustment in a plane parallel to the plane of the main telescope, and accordingly I provide, instead of the post construction shown in Figs. 1 and 2, opposite arms $a^{19}$, constituting substantially a Y-support, which contain at their upper ends bearings $a^{20}$ and clamping devices $a^{21}$, the same in construction and operation as the bearings $a^{16}$ and clamping devices $a^{18}$, and on these bearings I mount a transverse axis $a^{22}$, provided with a post $a^{23}$, the same in construction and function as the post $a^4$, and on this post $a^{23}$ are mounted the parts of the adapter, the same as already described. The axis $a^{22}$ is provided with a clamping-arm $a^{24}$, a clamping-screw $a^{25}$, and adjusting-screw $a^{26}$, in construction the same as the similar parts $a^{10}$ $a^{13}$ $a^{14}$, already described.

In connection with the foregoing apparatus I employ a special level for the purpose of correcting errors and ascertaining when the adjustments are correct, said level being indicated at $a^{27}$ and being of the revolving type, adjustably mounted at its ends $a^{28}$ and capable of revolving in arms $a^{29}$, which are themselves adjustably secured on the axis $a'$ of the main telescope, being clamped thereon by set-screws $a^{30}$, as herein shown, the result being that the line of collimation may be accurately determined in any situation, the arms $a^{29}$ being adjustable, and therefore permitting the level to be turned into any position—as, for instance, into the dotted-line position, Fig. 1, in which case, as will be readily understood, the level itself is rotated so as to bring the bubble uppermost.

In use the auxiliary telescope of the adapter is brought into level position by means of the trivets $a^6$ and is then turned into approximate alinement with the main telescope by means of the clamp and adjustments $a^8$ $a^9$. If the auxiliary telescope should not then lie in the vertical plane, including the vertical axis of the Y-support $a^7$, it is shifted horizontally by means of the conical bearings $a^{16}$ and clamps $a^{18}$. When brought into accurate alinement with its own vertical axis, however, it may be discovered that the entire adapter, from the trivets up, is not in the same vertical plane with the longitudinal axis of the main telescope, and accordingly the entire mechanism is shifted horizontally by means of the bearings $a^{20}$ and clamps $a^{21}$.

The result of the above-described mechanism is that in use the utmost precision and reliability may be secured.

The several bearing adjustments will usually be of most use to the manufacturer in adjusting the instrument at the works prior to sending it out.

Having described my invention, what I claim as new, and desire to secure by Letters Patent, is—

1. In a surveying instrument having a main telescope and an auxiliary telescope, means for adjusting said auxiliary telescope laterally in a plane parallel to the plane including the main telescope and its lateral axis.

2. In a surveying instrument having a main telescope and an auxiliary telescope, means for adjusting said auxiliary telescope laterally in a plane parallel to the plane including the main telescope and its lateral axis, said means including opposite arms having at their upper ends conical bearings longitudinally adjustable, and the adjacent axis having conical recesses fitting on and supported by said conical bearings, whereby the auxiliary telescope may be shifted by moving one of said conical bearings inwardly, and simultaneously moving the other conical bearing outwardly, in their respective arms.

3. In a surveying instrument having a main telescope and an auxiliary telescope, means for adjusting said auxiliary telescope laterally in a plane parallel to the plane including the main telescope and its lateral axis, said means including opposite arms having at their upper ends conical bearings longitudinally adjustable, the adjacent axis having conical recesses fitting on and supported by said conical bearings, whereby the auxiliary telescope may be shifted by moving one of said conical bearings inwardly, and simultaneously moving the other conical bearing outwardly, in their respective arms, and clamps for clamping said bearings in adjustment.

4. In a surveying instrument having a main telescope and an auxiliary telescope mounted above said main telescope and moving therewith, a vertical axis supporting said auxiliary telescope, and a horizontal axis for said auxiliary telescope carried by said vertical axis, means for shifting the said horizontal axis laterally relatively to said vertical axis in a plane parallel to the pivotal axis of the main telescope, and means for also shifting said vertical axis in a plane parallel to said main telescope and its pivotal axis.

5. In a surveying instrument, a main telescope having a horizontal pivotal axis, arms extending rigidly therefrom to constitute a Y-support, an axis mounted in said arms, said axis having conical recesses at its ends, and said arms being provided with longitudinally-adjustable conical bearings fitting in said recesses, a trivet adjustment mounted on the said axis mounted in said Y-support, a vertical axis carried rigidly by the upper side of said trivet adjustment, a second Y-support mounted on said vertical axis, and an auxiliary telescope mounted in said second Y-support.

6. In a surveying instrument, a main telescope having a horizontal pivotal axis, arms extending rigidly therefrom to constitute a Y-support, an axis mounted in said arms, said axis having conical recesses at its ends, and said arms being provided with longitudinally-adjustable conical bearings fitting in said recesses, a trivet adjustment mounted on the said axis mounted in said Y-support, a vertical axis carried rigidly by the upper side of said trivet adjustment, a second Y-support mounted on said vertical axis, an auxiliary telescope mounted in said second Y-support, said auxiliary telescope having a lateral pivotal axis provided at its ends with conical recesses, and pivotal bearings longitudinally adjustable in said second Y-support and in engagement with said conical recesses of the axis of said auxiliary telescope.

7. In a surveying instrument, a main telescope having a horizontal pivotal axis, arms extending rigidly therefrom to constitute a Y-support, an axis mounted in said arms, said axis having conical recesses at its ends, and said arms being provided with longitudinally-adjustable conical bearings fitting in said recesses, a trivet adjustment mounted on the said axis mounted in said Y-support, a vertical axis carried rigidly by the upper side of said trivet adjustment, a second Y-support mounted on said vertical axis, an auxiliary telescope mounted in said second Y-support, depending arms adjustably mounted on the axis of said main telescope, and a revolving level carried by said arms.

In testimony whereof I have signed my name to this specification in the presence of two subscribing witnesses.

CHRISTIAN L. BERGER.

Witnesses:
GEO. H. MAXWELL,
GEO. W. GREGORY.